United States Patent
Van Lieshout et al.

(10) Patent No.: US 8,325,649 B2
(45) Date of Patent: Dec. 4, 2012

(54) METHOD AND SYSTEM FOR TRANSMIT POWER CONTROL MANAGEMENT IN HSPA

(75) Inventors: Gert-Jan Van Lieshout, Bangalore (IN); Kundan Kumar Lucky, Bangalore (IN); Pradeep Dwarakanath, Bangalore (IN); Vinod Cherian Joseph, Bangalore (IN); Youn Heo, Bangalore (IN)

(73) Assignee: Samsung Electronics Co., Ltd (KR)

( * ) Notice: Subject to any disclaimer, the term of this patent is extended or adjusted under 35 U.S.C. 154(b) by 398 days.

(21) Appl. No.: 12/599,485

(22) PCT Filed: May 8, 2008

(86) PCT No.: PCT/KR2008/002604
§ 371 (c)(1), (2), (4) Date: Nov. 9, 2009

(87) PCT Pub. No.: WO2008/136651
PCT Pub. Date: Nov. 13, 2008

(65) Prior Publication Data
US 2010/0254324 A1    Oct. 7, 2010

(30) Foreign Application Priority Data
May 8, 2007  (IN) .............................. 976/CHE/2007

(51) Int. Cl.
*H04B 7/185* (2006.01)
*H04B 7/00* (2006.01)
(52) U.S. Cl. ........................................ 370/318; 455/522
(58) Field of Classification Search .................. None
See application file for complete search history.

(56) References Cited

U.S. PATENT DOCUMENTS

| | | | |
|---|---|---|---|
| 7,657,275 B2 * | 2/2010 | Kasturi et al. | 455/522 |
| 2003/0039217 A1 * | 2/2003 | Seo et al. | 370/318 |
| 2004/0136330 A1 | 7/2004 | Woo | |
| 2004/0166884 A1 * | 8/2004 | Oh et al. | 455/522 |
| 2005/0186981 A1 * | 8/2005 | Nishio | 455/522 |
| 2006/0246937 A1 | 11/2006 | Lindoff | |
| 2007/0133479 A1 * | 6/2007 | Montojo et al. | 370/335 |
| 2008/0207247 A1 * | 8/2008 | Gholmieh et al. | 455/522 |

FOREIGN PATENT DOCUMENTS
EP 01720264 A1 11/2006

OTHER PUBLICATIONS
3GPP TS 25.101 V5.13.0, User Equipment (UE) Radio Transmission and Reception (FDD) Release 5, Dec. 2004.

* cited by examiner

*Primary Examiner* — Andrew Chriss

(57) ABSTRACT

A method and apparatus are provided for determining a Transmission Power Control (TPC) command of an UpLink (UL) channel in a User Equipment (UE). The method includes storing TPC commands received through each Radio Link (RL) for preset combining periods, before entry into Discontinuous Transmission (DTX); combining the stored TPC commands; if all of the TPC commands are UP commands, determining a combined TPC command of the UL channel as a power level derived using a TPC command received in a designated previous DownLink (DL) slot among DL slots included in each RL, and controlling a transmit power of the UL channel, in a current DL slot which uplink transmission is resumed, using a power level corresponding to the determined TPC command.

8 Claims, 4 Drawing Sheets

METHOD AND SYSTEM FOR TRANSMIT POWER CONTROL MANAGEMENT IN HSPA

PRIORITY

This application is a National Stage Entry of PCT/KR08/02604 and claims priority under 35 U.S.C. §119(a) to Indian Patent Application No. 976/CHE/2007, which was filed in the Indian Patent Office on May 8, 2007, the content of each of which is incorporated herein by reference.

BACKGROUND OF THE INVENTION

1. Field of the Invention

The present invention relates generally to transmission power control management, and particularly, to transmission power control management in a User Equipment (UE) of a High Speed Packet Access (HSPA) network.

2. Description of the Related Art

As per the technical specification of the $3^{rd}$ Generation Partnership Project (3GPP) (3GPP TS 25.214 V07.04.00 and section 5.1.2.2.1), when an UpLink Discontinuous Transmission mode (UL_DTX_mode)=1, a Transmit Power Control (TPC) command does not have to be transmitted in any downlink slot starting during an uplink Dedicated Physical Control CHannel (DPCCH) slot, which is in an uplink DPCCH transmission gap, as defined in subclause 6C.2. Accordingly, a network is not required to transmit TPC commands to a UE in Fraction Dedicated Physical CHannel (F-DPCH) slots, which start during a UL transmission gap. Also the specification provides that the UE shall ignore any TPC commands received in an F-DPCH slot starting during an uplink DPCCH slot, which is in an uplink DPCCH transmission gap, as defined in subclause 6C.2. Accordingly, a UE ignores TPC commands sent by the network that overlaps with the uplink transmission gap.

In case of an uplink DPCCH transmission gap, as defined in the specification, the UE adds together the values of TPC Commands (TPC_cmd) derived from each TPC command combining period in which a TPC command is known to be present and is not ignored, as described above, and which cannot be applied before the uplink DPCCH transmission gap. The UE then applies the resulting sum of TPC_cmd values, when the uplink DPCCH transmission resumes. Thus, the TPC command applied at the time of resumption of transmission is a logical sum of the TPC commands derived from each TPC combining period.

Also, as per the specification, when UL_DTX_mode=1, a TPC command does not have to be transmitted in any downlink slot starting during an uplink DPCCH slot, which is in an uplink DPCCH transmission gap.

FIG. 1 illustrates a conventional timing diagram in which a UL transmission resumes from a DTX/Discontinuous Reception (DTX/DRX) gap and ends after a brief period of transmission.

Referring to FIG. 1, TPC commands sent by the network and their subsequent interpretation by the UE, as per existing description of 25.214 07.04.00, are shown. Thus, as per 3GPP technical specification TS 25.214 V07.04.00, section 5.1.2.2.1 or 5.1.2.3 and release R1-071824, TPC commands received in F-DPCH at positions $N_{OFF1}$=0 and 2 for slot number #4 101 do not have to be transmitted by the network, and should also be ignored by a UE, if received from the network.

However, because the output of γ equals 1, where γ denotes an output of the combined TPC commands, if the TPC commands from all the Radio Link Sets (RLSs) are reliably "1", or the output of γ equals −1, if a TPC command from any of the RLSs is reliably "0", the UE needs TPC commands of all the RLSs to derive a TPC command value as UP.

Consequently, power control transmission decision determined by the UE using methods of the prior art during DTX/DRX modes, as described above, is not efficiently handled. Further, because the prior art UE uses 2 DPCCH preambles prior to transmission of the actual data, the same power is used on both the DPCCH preambles at the time of resumption of transmission, which leads to sub optimal use of the available preambles.

SUMMARY OF THE INVENTION

It is accordingly the desideratum of the present invention to provide methods and a system that eliminate, or at least significantly alleviate, the limitations and drawbacks of the prior art, including those described herein above.

It is accordingly a particular object of the invention to efficiently determine transmission power control commands in a UE by combining TPC commands received during DTX/DRX modes in order to obtain efficient power control convergence. The combining is done on TPC commands that are received on different radio links, after ignoring any TPC commands received in a DL slot that does not overlap with a UL transmission. The UE uses the combined TPC commands as derived at the time of entry into DTX for a second UL DPCCH preamble transmission, thereby increasing link reliability and subsequent conservation of power by the UE.

The UE uses the same power as derived in a previous slot for resumption of transmission, when all of the TPC commands received in the DL slot that does not overlap with a UL transmission are UP.

A DOWN command can still be derived as per the existing 3GPP specification, when the UE receives a DOWN command on any of the radio links.

It is accordingly another object of the invention to determine TPC commands for the transmission of the 2nd DPCCH preamble at transmission resumption by combining stored TPC commands from each of the radio links that were received by the UE while entering into a DTX gap, where the TPC commands could not be applied with the newly received TPC commands.

It is accordingly another object of the invention to determine a transmission power of a UE prior to resumption of the transmission, by using a pattern of previous UL transmit power variations, thereby setting the transmit power to be used on UL DPCCH at the time of the resumption. The UL transmit power may be deduced using extrapolation based on the UL transmit power history. The determined power requirement by the UE at the time of resumption of transmission also satisfies a Signal to Interference Ratio (SIR) requirement at a Node B to attain fast power convergence.

In accordance with an object of the present invention, a method is provided for determining a Transmission Power Control (TPC) command of an UpLink (UL) channel in a User Equipment (UE). The method includes storing TPC commands received through Radio Links (RLs) for preset combining periods, before entry into Discontinuous Transmission (DTX); combining the stored TPC commands; if all of the stored TPC commands are UP commands, determining a combined TPC command of the UL channel derived using a TPC command received in a designated previous DownLink (DL) slot among DL slots included in the RLs; and controlling a transmit power of the UL channel, in a current DL slot in which uplink transmission is resumed, using the power level corresponding to the determined TPC command.

In accordance with another object of the present invention, a User Equipment (UE) is provided for determining a Transmission Power Control (TPC) command of a transmit power of an UpLink (UL) channel. The UE includes a memory for storing TPC commands received through Radio Links (RLs) for preset combining periods, before entry into Discontinuous Transmission (DTX); and a controller for combining the stored TPC commands, if all of the stored TPC commands are UP commands, determining a combined TPC command of the UL channel as derived using a TPC command received in a designated previous DownLink (DL) slot among DL slots included in the RLs, and controlling a transmit power of the UL channel, in a current DL slot in which uplink transmission is resumed, using the power level corresponding to the determined TPC command.

Thus, the UE is not required to use a same power level for the first 2 DPCCH power control preambles to be transmitted at DTX resumption. The UE can adjust the power level to either ramp up or ramp down the power level from the 1st preamble to the 2nd preamble power to optimize UE power consumption. For example, long-term statistics can be used to make a decision on whether to ramp up or ramp down.

At DTX resumption, it is beneficial to the UE, in terms of power consumption, even if the UE blindly uses 1 step size lower then the calculated UL DPCCH preamble power (stored UL TPC commands that UE could not use at the time of entry into DTX) and then ramps up by 1 step size and transmits the 2nd DPCCH preamble.

BRIEF DESCRIPTION OF THE DRAWINGS

The above and other objects, features, and advantages of the present invention will become more apparent from the ensuing detailed description of the invention taken in conjunction with the accompanying drawings, in which.

GLOSSARY OF TERMS AND DEFINITIONS THEREOF

Figure 1:
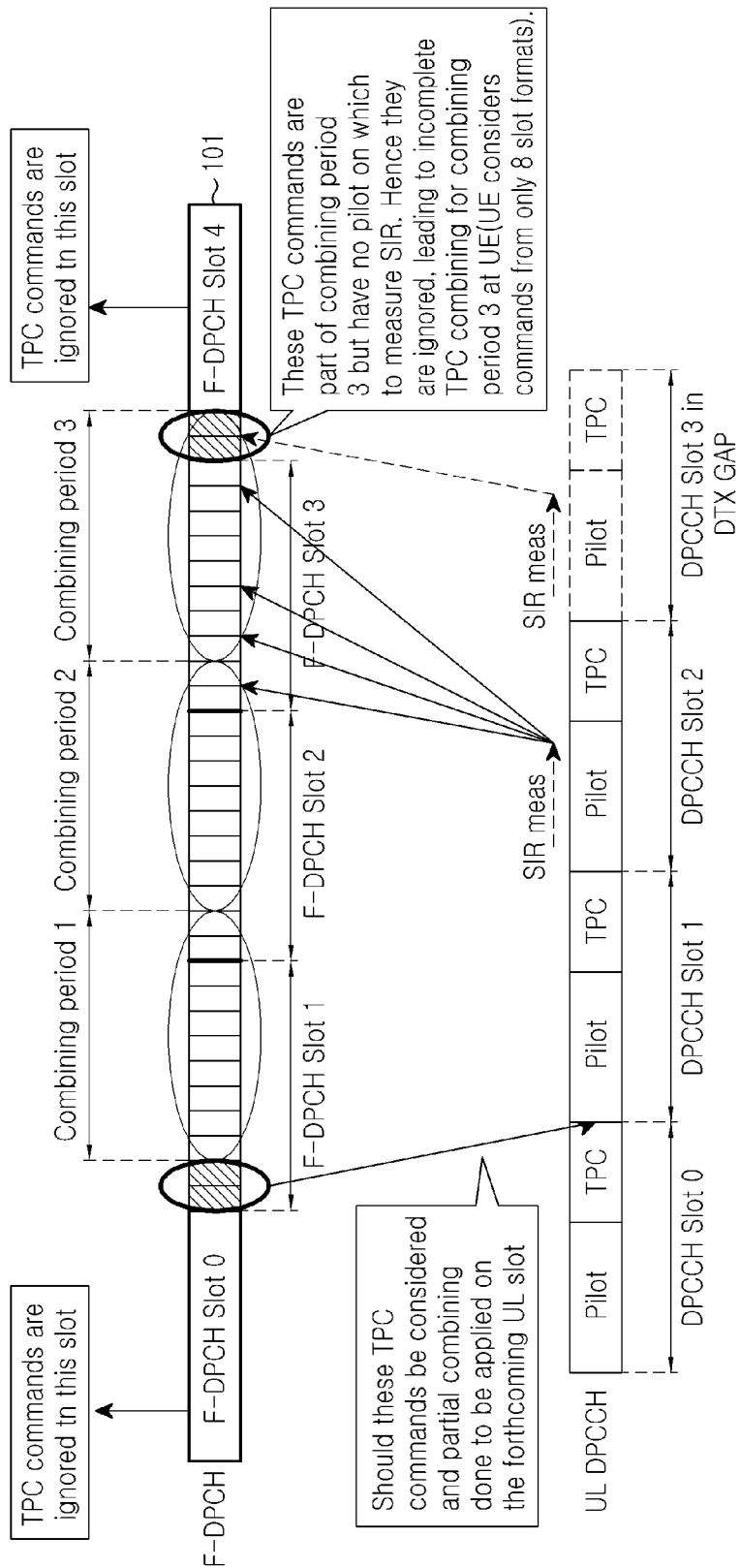
FIG. 1 illustrates a conventional timing diagram in which a UL transmission resumes from a DTX/DRX gap and ends after a brief period of transmission.

CPC: Continuous Packet Connectivity
UL: Uplink
DRX: Discontinuous Reception
DTX: Discontinuous Transmission
DPCCH: Dedicated Physical Control Channel
F-DPCH: Fractional Dedicated Physical Channel
UE: User Equipment
TPC: Transmit Power Control
$TPC_{gap}$: TPC commands received during a UL Transmission GAP
$TPC\_cmd_N$: Combined TPC command for the last combining period (Combining period N) before entry into DTX
$TPC\_cmd_{N-1}$: Combined TPC command for the previous to last combining period (Combining period N-1) before entry into DTX
$TPC\_Cmd_{stored-Sum}$: Combined TPC command for the last 2 combining periods (Combining period N-1 and N) before entry into DTX, i.e., combining $TPC\_cmd_N$ and $TPC\_cmd_{N-1}$.
$TPC\_Cmd_{Latest}$: Combined TPC command derived from individual TPC commands received from RLs in response to UL DPCCH slot 0 transmission
RLS: Radio Link Set
RL: Radio Link
RoT: Rise over thermal

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Determination of transmission power control commands in the UE is achieved by combining TPC commands received during DTX/DRX modes. Specifically, the combining is performed on TPC commands that are received on different radio links, after ignoring TPC commands received in a DL slot that does not overlap a UL transmission. Thereafter, the UE uses the combined TPC commands as derived at the time of entry into DTX for the second UL DPCCH preamble transmission, thereby increasing link reliability and subsequent conservation of power by the UE.

As described above, combining is performed such that the output of γ shall equal 1, if the TPC commands from all the RLSs, which are not ignored according to 3GPP TS section 5.1.2.2.1, are reliably "1", and the output of γ shall equal −1, if a TPC command from at least one of the RLSs, which are not ignored according to 3GPP TS section 5.1.2.2.1, is reliably "0".

The combining can also be performed such that the transmit power remains the same as 1st DPCCH preamble, if the TPC commands from all the RLSs are not received, or the output of γ equals to −1, if a TPC command from any of the RLSs received by the UE is reliably "0". That is, the output of γ shall equal 1 if the TPC commands from all the RLSs, which are not ignored according to 3GPP TS section 5.1.2.2.1, are reliably "1", and the output of γ shall equal −1, if a TPC command from any of the RLSs, which are not ignored according to 3GPP TS section 5.1.2.2.1, is reliably "0". If some TPC commands are ignored according to section 5.1.2.2.1 and TPC commands from remaining RLSs are reliably "1", the UE uses the same power as previous slot.

The method of combining the TPC commands received from a subset of an RLS at TPC positions $N_{OFF1}$=0 and 2, in response to the 1st UL DPCCH preamble transmission is described. A soft decision is taken based on the TPC commands received in response to the $1^{st}$ DPCCH preamble and the stored TPC commands received in the last 2 combining periods before UE entered into DTX.

Figure 2:
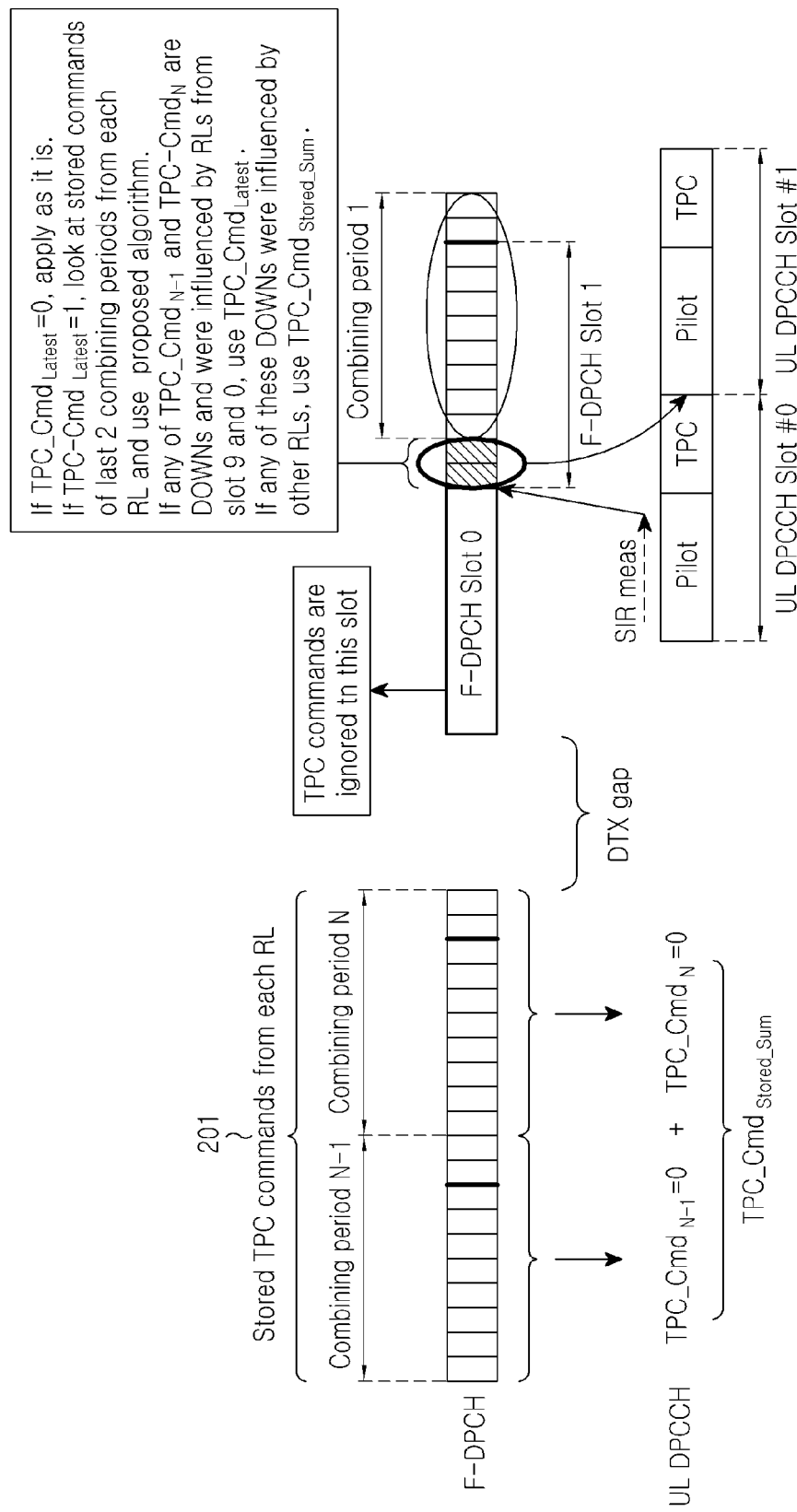
FIG. 2 illustrates a method of deriving a TPC_Cmd at UL DPCCH Slot #1 according to an embodiment of the invention.
Figure 3:
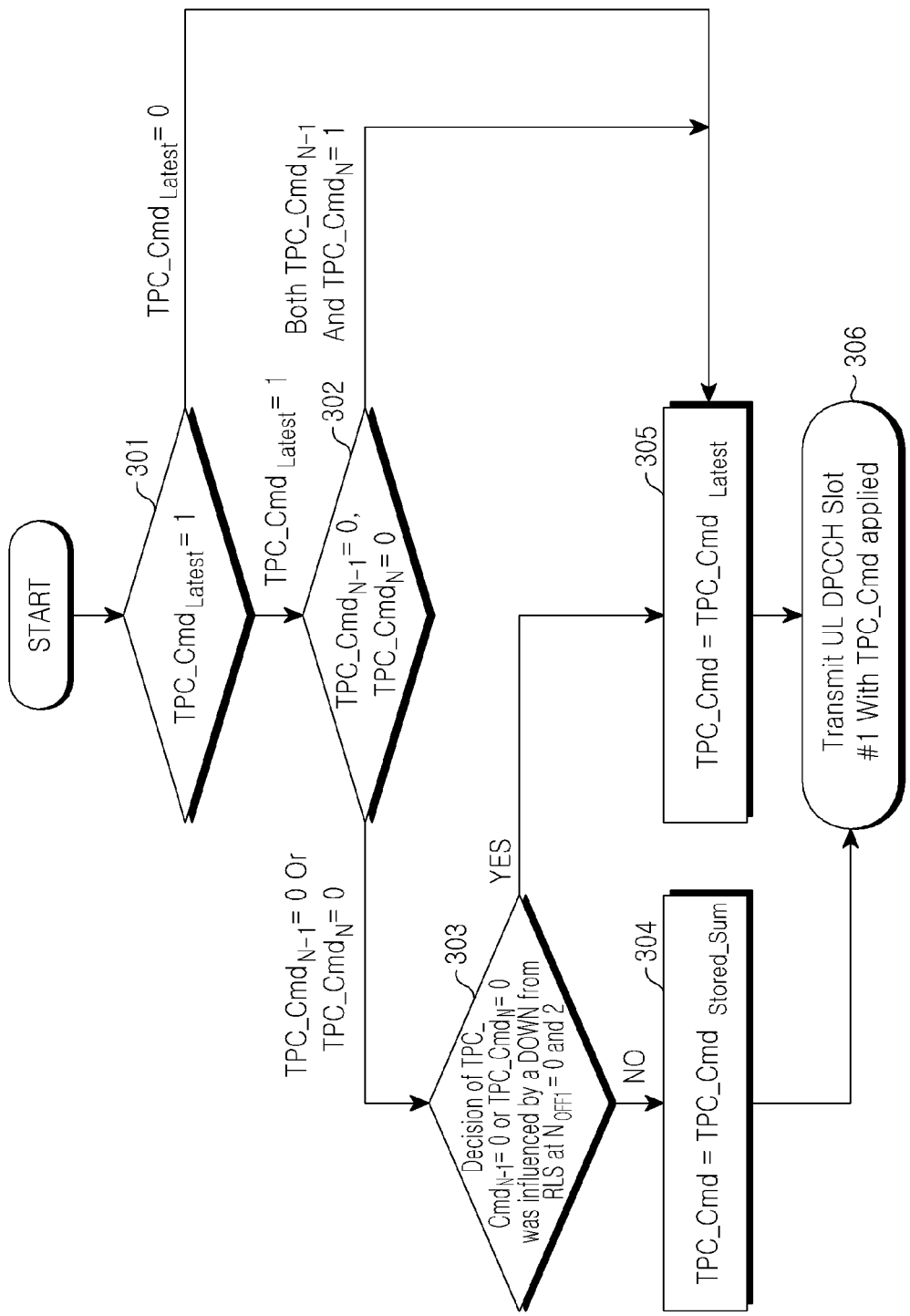
FIG. 3 illustrates a method for TPC command application for UL DPCCH slot #1 according to an embodiment of the invention.

FIG. 2 illustrates a method of deriving a TPC_Cmd at UL DPCCH Slot #1 according to an embodiment of the invention, and FIG. 3 illustrates a method for TPC command application for UL DPCCH slot #1 according to an embodiment of the invention.

Referring to FIGS. 2 and 3, the TPC commands 201 received from each RL for the last 2 combining periods before entry into DTX are stored in the UE. If at the time of resumption, at TPC positions $N_{OFF1}=0$ and 2, the UE receives any DOWN command in step 301, then a power step DOWN command is applied to the next UL DPCCH command in steps 305 and 306.

However, if at TPC positions $N_{OFF1}=0$ and 2 of F-DPCH slot #4, the UE receives UP commands in step 301, then the same TPC command positions in the stored combining periods received before entry into DTX are verified in step 302.

If any of the stored TPC_cmd$_N$ or TPC_cmd$_{N-1}$ is DOWN in step 302, and this was influenced by TPC commands at positions $N_{OFF1}=0$ and 2 in step 303, then in steps 305 and 306, the UE uses the combined TPC command TPC_cmd$_{Latest}$ derived from F-DPCH slot #1 from TPC commands received at positions $N_{OFF1}=0$ and 2, as illustrated in FIG. 2.

However, if any of the stored TPC_cmd$_N$ or TPC_cmd$_{N-1}$ is DOWN in step 302, and this was influenced by other RLS in step 303, then UE uses the combined stored TPC_Cmd$_{Stored-Sum}$ in step 304.

As illustrated in FIG. 3, the UE does not have to use the same power on the second UL DPCCH slot, as used for the first UL DPCCH slot, because it has valid TPC commands from network received at TPC position $N_{OFF1}=0$ and 2, which it can combine and apply.

The UE uses variable transmit powers on the 2 DPCCH preambles it transmits at the time of UL DTX resumption to suite the channel conditions prevalent at the time of resumption.

Figure 4:
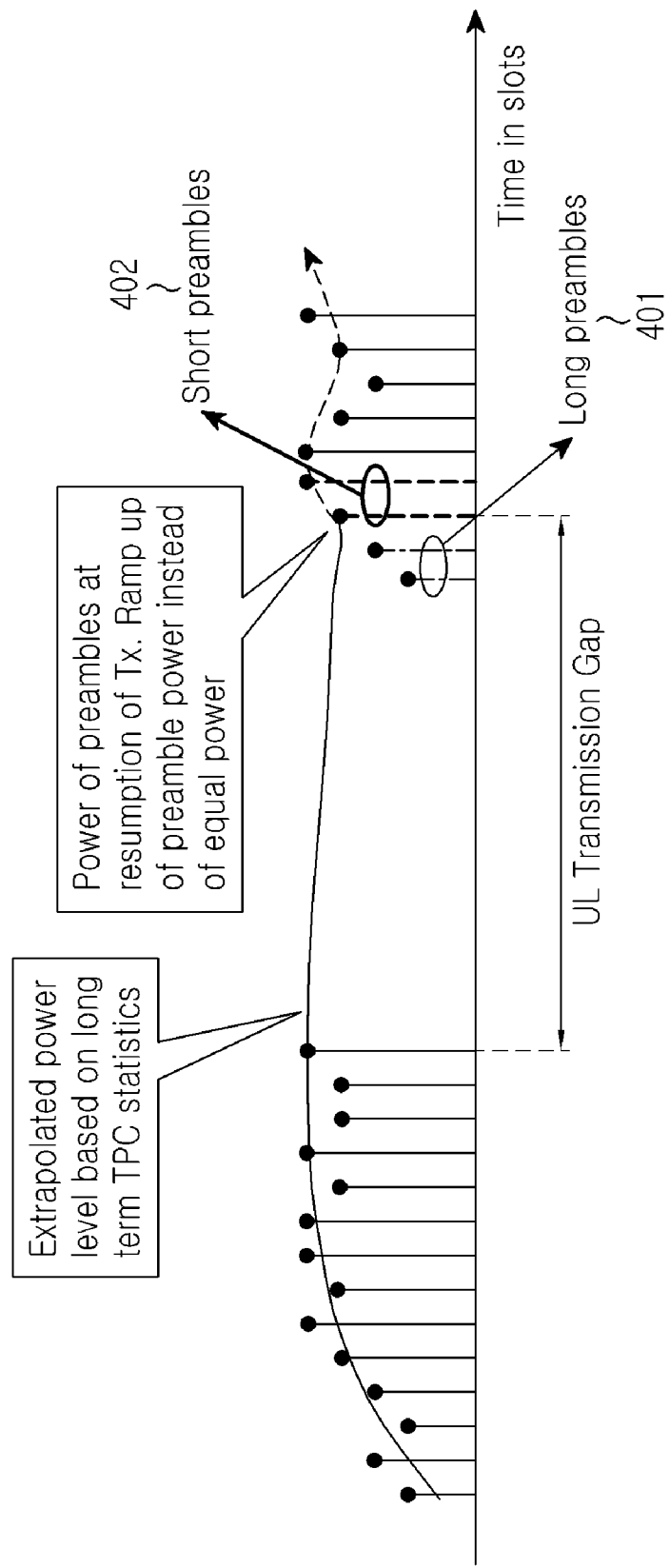
FIG. 4 illustrates a method for determining UL power at resumption with unequal DPCCH preamble power by using a power level of a last combined command and long term statistics according to an embodiment of the invention.

FIG. 4 illustrates a method for determining UL power at resumption with unequal DPCCH preamble power by using a power level of a last combined command and long term statistics according to an embodiment of the invention. Specifically, FIG. 4 illustrates the method to determine the UL power at resumption with unequal DPCCH preamble.

Referring to FIG. 4, the UE can use 1 step lower power than the stored calculated power on the first preamble (401) and then can ramp up to the stored calculated power for the second DPCCH preamble (402). This helps the UE attain fast convergence and also conserve power.

Various methods can be used to choose the powers of the 2 DPCCH power control preambles:

1) Using one step size below the calculated and stored TPC command on the $1^{st}$ DPCCH preamble, and then ramping up to the calculated single TPC command for the for the $2^{nd}$ DPCCH preamble.

2) Using TPC statistics to find an estimate of the variation of the UL channel, the SIR target revisions in the DL from the previous DTX period to current DTX period, and following the pattern to extrapolate the values of the 2 TPC commands.

3) Using long term TPC statistics and open loop uplink power calculation based on DL power to arrive at the transmission power for the first DPCCH preamble, after DTX, using long preambles, after a long DRX/DTX period. Using either ramp up or ramp down based on the behavior of the long term TPC commands for the second DPCCH preamble after DTX. From the $3^{rd}$ DPCCH preamble onwards, TPC commands received from the base station are to be followed.

Thus, the UE does not have to use the same power level for the first 2 DPCCH power control preambles to be transmitted at DTX resumption. Instead, a UE can adjust the power level to either ramp up or ramp down the power level from the 1st preamble to the 2nd preamble power to optimize on UE power consumption.

Long-term statistics can be used to make a decision on whether to ramp up or ramp down.

It is beneficial for the UE, in terms of power consumption, even if the UE blindly uses 1 step size lower then the calculated UL DPCCH preamble power (stored UL TPC commands, which the UE could not use at the time of entry into DTX) at DTX resumption, and then ramps up by 1 step size and transmits the 2nd DPCCH preamble.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. A method for determining a Transmission Power Control (TPC) command of an UpLink (UL) channel in a User Equipment (UE), the method comprising:
    storing TPC commands received through Radio Links (RLs) for preset combining periods, before entry into Discontinuous Transmission (DTX);
    combining the stored TPC commands;
    if all of the stored TPC commands are UP commands, determining a combined TPC command of the UL channel derived using a TPC command received in a designated previous DownLink (DL) slot among DL slots included in the RLs; and
    controlling a transmit power of the UL channel, in a current DL slot in which uplink transmission is resumed, using the power level corresponding to the determined TPC command.

2. The method of claim 1, wherein the DL slots included in the RLs do not include DL slots that do not overlap with UL slots for a UL transmission.

3. The method of claim 2, further comprising:
    resuming transmission of the UL channel using a same power level derived in the designated previous DL.

4. The method of claim 2, wherein if at least one of the stored TPC commands is a DOWN command, determining the TPC command of the transmit power of the UL channel as DOWN command.

5. A User Equipment (UE) for determining a Transmission Power Control (TPC) command of a transmit power of an UpLink (UL) channel, the UE comprising:
    a memory for storing TPC commands received through Radio Links (RLs) for preset combining periods, before entry into Discontinuous Transmission (DTX); and
    a controller for
        combining the stored TPC commands,
        if all of the stored TPC commands are UP commands, determining a combined TPC command of the UL channel derived using a TPC command received in a designated previous DownLink (DL) slot among DL slots included in the RLs, and
        controlling a transmit power of the UL channel, in a current DL slot in which uplink transmission is resumed, using the power level corresponding to the determined TPC command.

6. The UE of claim 5, wherein the DL slots included in the RLs do not include DL slots that do not overlap with UL slots for a UL transmission.

7. The UE of claim 6, wherein the controller resumes transmission of the UL channel using a same power level derived in the designated previous DL.

8. The UE of claim 6, wherein if at least one of the stored TPC commands is a DOWN command, the controller determines the TPC command of the transmit power of the UL channel as DOWN command.

* * * * *